United States Patent [19]

Casteel et al.

[11] Patent Number: 4,658,192

[45] Date of Patent: Apr. 14, 1987

[54] PROGRAMMABLE DEADBAND CURRENT REGULATOR

[75] Inventors: Jordan B. Casteel, Charlottesville, Va.; David L. Lippitt, Scotia, N.Y.; Allen M. Ritter, Charlottesville, Va.

[73] Assignee: General Electric Company, Charlottesville, Va.

[21] Appl. No.: 825,086

[22] Filed: Jan. 31, 1986

[51] Int. Cl.$^4$ ............................................. H02P 5/16
[52] U.S. Cl. ................................. 318/317; 318/257; 318/809
[58] Field of Search ................... 318/257, 809, 317

[56] References Cited

U.S. PATENT DOCUMENTS

| | | | |
|---|---|---|---|
| 3,654,541 | 4/1972 | Kelley et al. | 318/257 X |
| 4,565,953 | 1/1986 | Espelage et al. | 318/809 |
| 4,567,408 | 1/1986 | Mitsuhashi | 318/317 |

*Primary Examiner*—Benjamin Dobeck
*Attorney, Agent, or Firm*—Duckworth, Allen & Dyer

[57] ABSTRACT

A method for supplying the excitation to a four quadrant drive DC electric motor having a forward and reverse controllable bridge rectifier power regulators for controlling the direction of motor rotation. The motor control system is capable of operating in a continuous and discontinuous current mode of operation and includes an electronic control circuit for calculating a firing angle from desired and measured system parameters.

The electronic control system includes a reversing controller for developing a current command for generating firing pulses to fire selected switching elements in the power regulators for controlling the magnitude and polarity of the excitation, and a current sensor for sensing motor current. The method provides a smooth, continuous transitioning between the forward and reverse bridge in response to a sensed requirement for reversing excitation to the motor.

17 Claims, 3 Drawing Figures

DISCONTINUOUS CONDUCTION

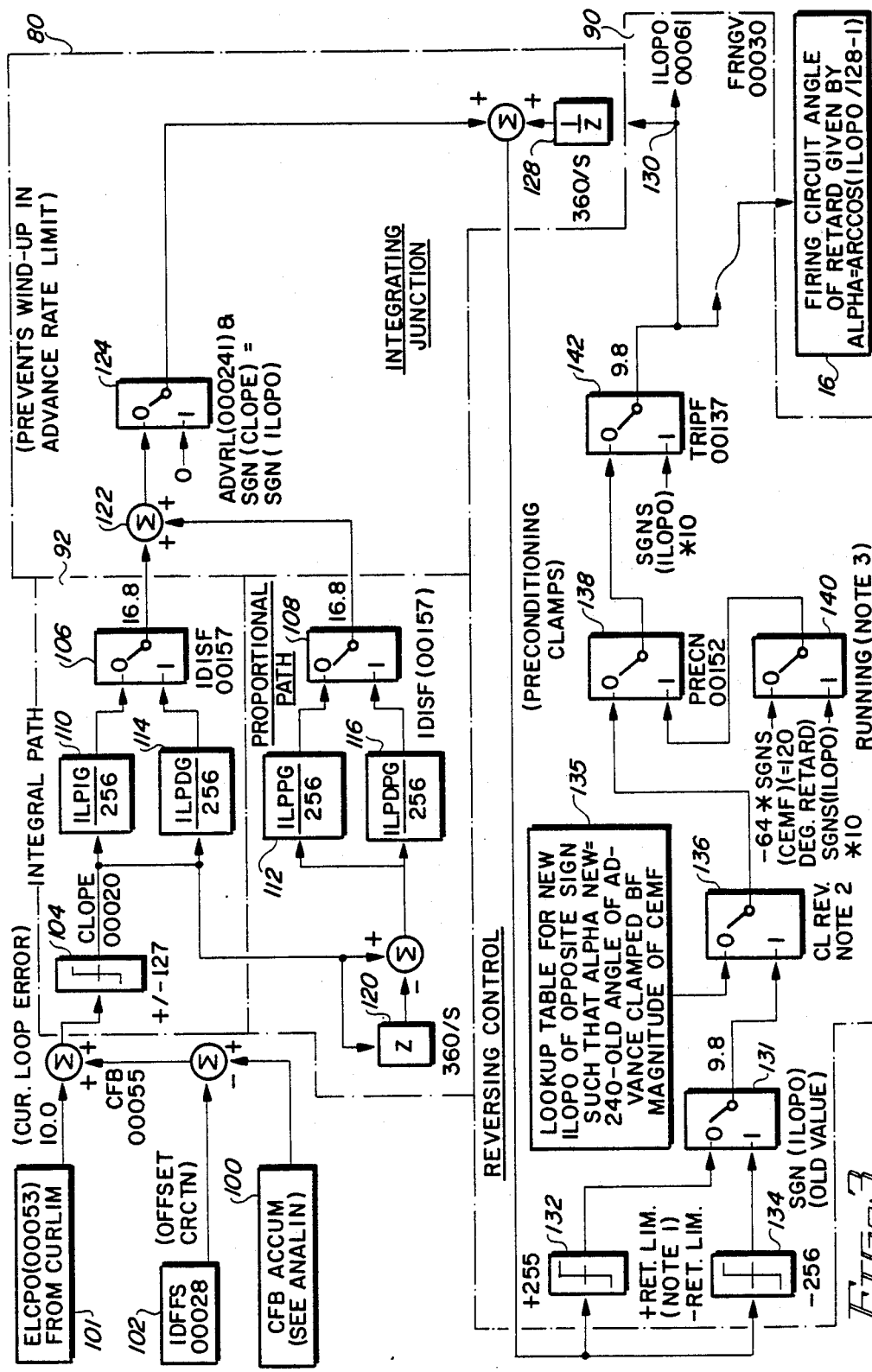

PROGRAMMABLE DEADBAND CURRENT REGULATOR

BACKGROUND OF THE INVENTION

A. Field of the Invention

This invention relates to electronic digital control systems for controlling solid state rectifiers in a reversible bridge configuration connected between an AC power source and a DC electric motor; and more particularly, to a method for controlling the firing angle of the controllable rectifiers regulating the transition from the forward conducting bridge to the reverse conducting bridge.

B. Background Discussion

Numerous DC electric motors are found in industrial use where variable speed, reversing, positioning or battery operation is needed. A DC motor is well suited for where precise control and position is desired. For example, a DC electric motor which powers an elevator requires a very precise control system to accurately stop the elevator and align the floors of the elevator and the building. In stopping the elevator, it is first necessary to excite the DC electric motor in the reverse direction prior to a complete stop. During the reversal it is very desirable to maintain as much control of the DC electric motor as possible and to provide a smooth continuous transition from the forward to reverse direction.

As is well known, this type of control system is well suited for electronic servo system control. The servo system control is typically designed as a closed loop system with a speed controller as the outer servo loop and a current controller as the inner servo loop. The control system is usually designed with the DC electric motor fed from a three phase bridge convertor having a first and second controllable bridge rectifier power regulators activated by the speed and current controllers.

In the past, controlling the conduction of the rectifiers have generally been accomplished by using analog control devices to perform the regulating functions required and converting the analog signal into digital values to activate the rectifiers. These analog devices invariably are proportional plus integral controllers for the speed and current loops. These controllers regulate the speed of the DC electric motor by controlling the activation of antiparallel-connected, three-phase dual silicon control rectifiers (SCR). Six SCRs form a forward bridge to drive the motor in the forward direction and six SCRs form a reverse bridge to drive the motor in the reverse direction. The point, as an angle, along the control voltage half-cycle at which an SCR activates is known as the firing angle.

In analog systems the manner of controlling the speed of a DC motor, when operating in either continuous or discontinuous current mode is well known, as is the manner of reversing the direction of the motor. It is also known that one criteria for reversing the direction of a DC electric motor is that the motor current be zero at the time of reversal. In analog systems, in order to make this reversal it is first necessary to detect when the current is zero and then to wait a specified safe period before reversing the motor.

Driven by these bridges, the DC electric motor can operate under conditions of both positive and negative values of motor voltage and motor current. The foregoing conditions represent four separate states, sometimes referred to as four quadrant control. The positive and negative voltage correspond to desired clockwise or counterclockwise rotation in the motor. The current corresponds to desired clockwise and counter clockwise torque. Two of these states correspond to normal motoring modes wherein both the voltage and the current have the same sense, either positive or negative. In the motoring modes, the motor is driven from the power source. The other two states correspond to regenerative modes, wherein the voltage and the current have an opposite sense, one being positive while the other is negative. In the regenerative mode, the internal generated motor current is utilized to produce desired torque.

In four quadrant reversing drives the transition from the forward conducting bridge to the reverse non-conducting bridge is normally handled to extinguishing the current in one bridge prior to allowing conduction in the other. Typically, control is to bring the offgoing bridge to full retard (firing angle of 180 degrees) and enable the oncoming bridge at full retard. This method ensures the extinction of current in the bridge before current is established in the other direction. The period of transition from extinction of one bridge to initial conduction of the other bridge is the basis for a deadband exhibited between forward and reverse current of flow. The deadband limits the outer speed regulator control loop band width. In other words, in the deadband region, control of the motor is severely limited. The minimum deadband is that which just allows the conducted current to become discontinuous prior to reversal when the next SCR fires in the oncoming bridge.

The essential condition for the reversal is that conducted current be discontinuous prior to the bridge reversal and that the average current level be sufficiently low as to form nearly linear response around the reversal. A problem of past digital and analog controllers is measuring inaccurately the discontinuous current for timing the bridge reversal. Another problem that occurs is measuring inaccurately current during the region of reversal. Any current signal during reversal represents inaccuracies in the current feedback circuitry which requires compensation. Prior digital and analog controllers had problems determining the oncoming firing angle such that it sufficiently advances to produce light conduction, eliminating the deadband that would have occurred if the angle had to advance from retard limit.

An inaccurate reading in the current during reversal is a considerable problem, because the magnitude of the current may be small and its wareshape flat. In addition, the ability to alter and optimize firing sequence in reversal is very desirable in order to provide smooth, continuous system operation.

Therefore, it is an object of the present invention that the average level of conducted current prior to reversal and subsequent to reversal exhibit a linear voltage characteristic across the reversal.

It is another object to extend the linear behavior of the current control and thus enable higher bandwidth of the speed control loop.

It is a further object of this invention to correctly select the initial firing angle on a reversal source to minimize the deadband.

It is a further object of this invention to base the choice of bridge on information that exhibits more accurate control over the actual bridge selection, even in the presence of offset error in the current feedback signal itself.

SUMMARY OF THE INVENTION

The present invention relates to a method of controlling the direction of motor rotation of a DC electric motor in a closed loop control system of the type capable of operating in the continuous and discontinuous current modes of operation. The method calculates a firing angle from systems parameters proportional to desired and actual motor speed and desired and actual direction of motor rotation. A reverse polarity motor current is developed by firing a selected solid state switch in a reversible bridge connected between an AC source and a DC electric motor.

A current command signal is derived from an input command or a system control such as a tension regulator or speed regulator. An average current feedback signal is derived from several readings of the current signal during a single conduction period plus compensation for an erroneous offset as determined in the signal during the previous reversal. A current loop error is determined from the difference of the current command signal and current feedback signal. The current loop error is applied to an input of a current regulator. Bridge reversal is effected by the current regulator when the sign of the current differs from the sign of the current loop error, the average current value is below a reversal threshold so that the voltage exhibits a linear characteristic across the reversal, the current conduction is determined to be discontinuous as indicated by the latest reading of offset corrected current signal and the current regulator has commanded a retard in the firing angle by a determined voltage. These conditions request a change of the conducting bridge which is accomplished by the firing circuit control for the bridges.

The existence of offset error in the current feedback signal is determined and compensated for by storing the current feedback signal during that period of time when neither bridge is conducting. This value represents a true offset because no current is flowing. Compensation for this offset is achieved by adjusting future current feedback signals by the amount averaged during the zero current region of reversal.

During a normal reversal, the firing angle just before reversing is such that the voltage produced by the firing is very nearly equal to the motor back EMF. This firing angle allows selection of the oncoming firing angle such that it is sufficiently advanced to produce light conduction, eliminating the deadband that would have occurred if the angle had to advance from retard limit. The oncoming firing angle is also limited by the current regulator's knowledge of motor back EMF in order to bound the oncoming current pulse should the bridge reversal request be exceptionally retarded from when normal reversal requests are initiated. This bounting feature guarantees that even if reversal is held off to a large retarding condition that the oncoming current pulse will be no greater than the firing angle which will cause continuous current.

BRIEF DESCRIPTION OF THE DRAWING

These and other objects and advantages of the present invention will become apparent by referring to the following description and accompanying drawings in which:

FIG. 3 is a functional block diagram of the current regulator for the four quadrant DC electric motor.

While the present invention will be described hereinafter with particular reference to the accompanied drawings in which operating embodiments of the method of the present invention are shown, it is to be understood at the outset of the description which follows, that it is contemplated that the methods in accordance with the present invention may be varied from the specific forms described hereinafter, while still obtaining the desired results of this invention. Accordingly, the description which follows is to be understood as a broad teaching disclosure directed to a person of appropriate skill in the appropriate arts, and not as limiting upon the scope of this invention.

DESCRIPTION OF AN ILLUSTRATIVE EMBODIMENT

A. General Description

Figure 1:
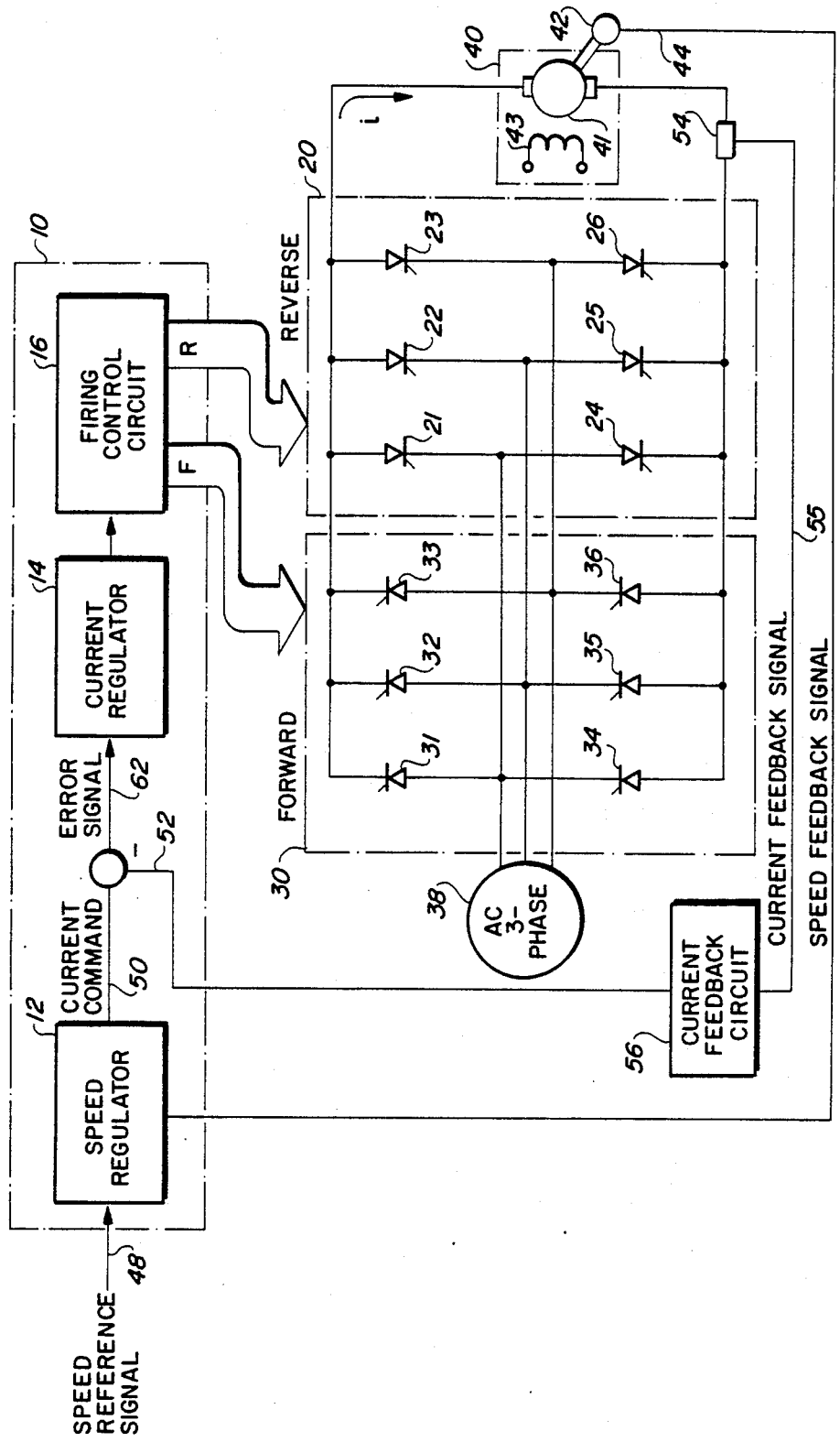
FIG. 1 illustrates the switching bridges and associated control logic of a four quadrant DC electric motor.

FIG. 1 illustrates the digital motor control circuit constructed in accordance with the present invention in controlling current in a DC electric motor. The motor control circuit 10 includes a digital control (speed) regulator 12, a digital current regulator 14, and a digital firing control circuit 16. The digital control circuit controls energization of a forward switching bridge 30 and a reverse switching bridge 20 which is coupled to an AC power supply 38 for providing current to the DC electric motor 40.

The DC electric motor 40 comprises an armature winding 41 and a field winding 43. A current shunt 54 in series with armature 41, the forward switching bridge 30 and reverse switching bridge 20 provide a signal indicative of armature current. A digital current feedback circuit 56 computes a current feedback signal 52 to the digital motor control circuit 10. It is understood, that the digital current feedback circuit 56 contains the necessary hardware and logic to sample, average and hold numerous current samples for generating the current feedback signal 52. A speed sensor 42 measures the speed of the DC electric motor 40 and transmits a speed feedback signal via line 44 to the digital speed regulator 12. A speed reference signal 48 is applied as one input to the digital speed regulator 12. The speed reference signal 48, generated externally, provides a desired rotational speed of the DC electric motor 40.

The digital speed regulator 12 determines the rotational speed of the DC electric motor 40 via the speed feedback signal 44 and the speed reference signal 48 and outputs a current command signal 50. The current command signal 50 gets tested against the current feedback signal 52 creating a current loop error signal 62. The current loop error signal 62 determines whether or not more or less current needs to be produced by the digital current regulator 14 to drive the digital firing control circuit 16.

The digital current regulator 14 generates commands for the digital firing control circuit 16 to energize, hereinafter referred to as fire, the forward switching bridge 30 and the reverse switching bridge 20. The forward switching bridge 30 is comprised of switching elements 31–36. The reverse switching bridge 20 is comprised of switching elements 21–26. The switching elements as illustrated are silicon controlled rectifiers (SCR), which are fired approximately every 60° to generate a DC current in the DC electric motor 40 from the three phase AC power source 38. The forward switching bridge 30 generates a current in the DC electric motor to energize the DC electric motor 40 in a forward direction. The reverse switching bridge 20 generates a current in the DC electric motor to drive the motor in a reverse direction. The DC electric motor 40 operates in a four quadrant operation, well known in the art, consisting of positive motor current and positive motor voltage, positive motor current and negative motor voltage, negative motor current and positive motor voltage, and negative motor current and negative motor voltage.

B. Operation of Motor Control Circuit 10

The motor control circuit 10 operates in a servo control system with the inner loop known as the current loop and the outer loop known as the speed control loop, which are well known to those of ordinary skill in the art. The current loop includes the current feedback circuit 56, current regulator 14, and firing control circuit 16.

Preferably, the implementation of the current loop in the present embodiment is by means of a programmable microcomputer and interface means in which the microcomputer monitors system parameters proportional to desired motor speed, actual motor speed, motor direction, and motor current and calculates the firing angle specified in an instant at which a selective rectifier is to be fired to deliver maximum power to the DC motor 40 in accordance with the direction of motor rotation. It is to be understood that the current feedback circuit 56, the current regulator 14, and the firing control circuit 16 includes the necessary hardware and logic for receiving a current command from the speed control loop and calculating the value of a firing angle to generate a firing pulse for a selected rectifier. One form of current feedback circuit, current regulator and firing control circuit is disclosed in U.S. Pat. No. 4,090,116, assigned to General Electric Company, the disclosure of which is hereby incorporated by reference.

1. Digital Current Regulator 14

The digital current regulator 14 receives an error signal 62, hereinafter referred to as current loop error, and integrates the current loop error for producing a firing angle command to the firing control circuit 16. For example, if the speed regulator generates a current loop error that requires firing the nonconducting bridge (bridge not presently firing), the current regulator 14 generates the appropriate commands for the firing control circuit 16 for reversal or changeover. During the period of changeover, no firing angle command will be generated by the current regulator 14 to the firing control circuit 16. This may be for only a fraction of the period of changeover, but during this time, no control commands are sent to the motor. This loss of control or deadband region is programmable in the digital current regulator 14, ranging from a minimum deadband to a deadband larger than prior art analog current regulators.

The digital current regulator 14 contains a digital proportional plus integral integrator and a reversing control which generates the appropriate current command for the digital firing control circuit 16. In the prior art, the current regulator and speed regulator were analog devices. The proportional plus integral integrator of the analog current regulator had a very slow response in switching from the forward to the reverse bridge. The delay or deadband in switching from the forward to reverse bridges can be as much as 100 msec for prior art analog current regulators.

In determining whether it is safe to switch from the forward to reverse bridge, it is necessary for the current through the DC electric motor to become discontinuous, so as not to blow a fuse or damage an SCR. As soon as the current goes discontinuous, it's safe to reverse, because at this point all the switching elements are off and there is no current flowing in the motor.

2. Firing Control Circuit 16

The firing control circuit 16 generates a firing pulse for a selected SCR from the current loop output. Basically, when current is flowing in the motor, the differential equation for the armature circuit with a firing angle X1 is given by $$L \frac{di}{dt} + Ri + V = E_m \sin\left(wt + \frac{\pi}{3} + X_1\right) \quad (1)$$

where $E_m$ is the amplitude of line to line voltage, and L and R are the inductance and resistance of the motor plus circuit, respectively. In terms of induced voltage of the motor or back EMF, equation (1) can be rewritten:

$$L = \frac{di}{dt} + Ri = E_m \sin wt - E_c \quad (2)$$

where $E_c$ is the motor back EMF.

Figure 2A:
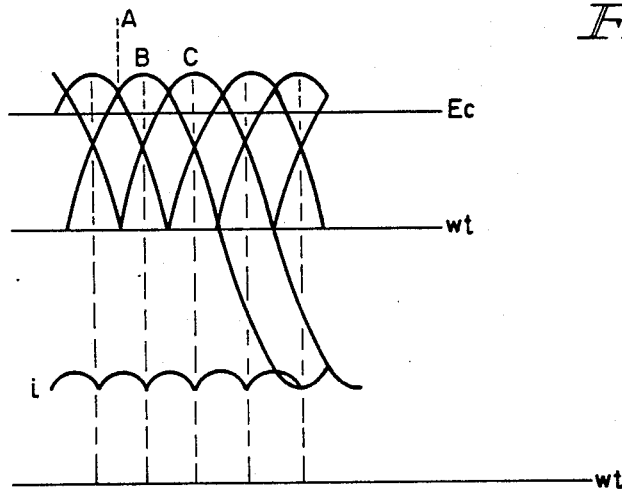
FIG. 2 illustrates the voltage waveforms of the switching elements to demonstrate the operation of the switching bridge during bridge reversal.
Figure 2B:
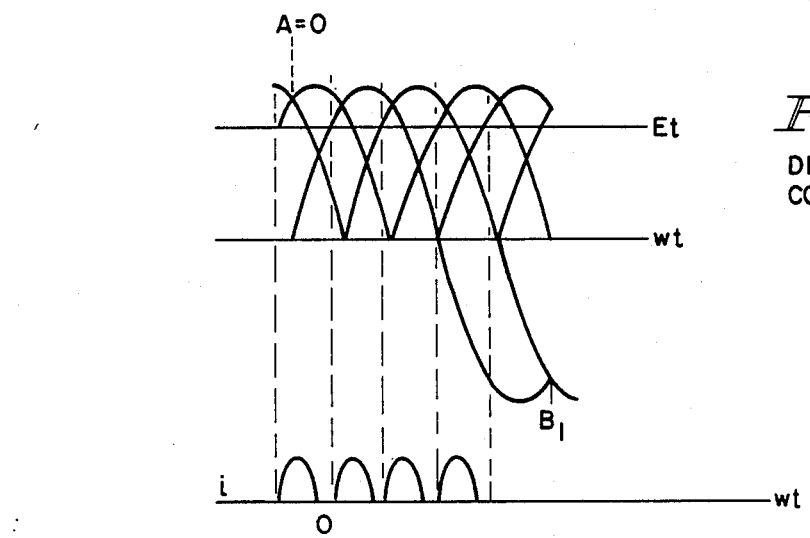
Figure 2C:
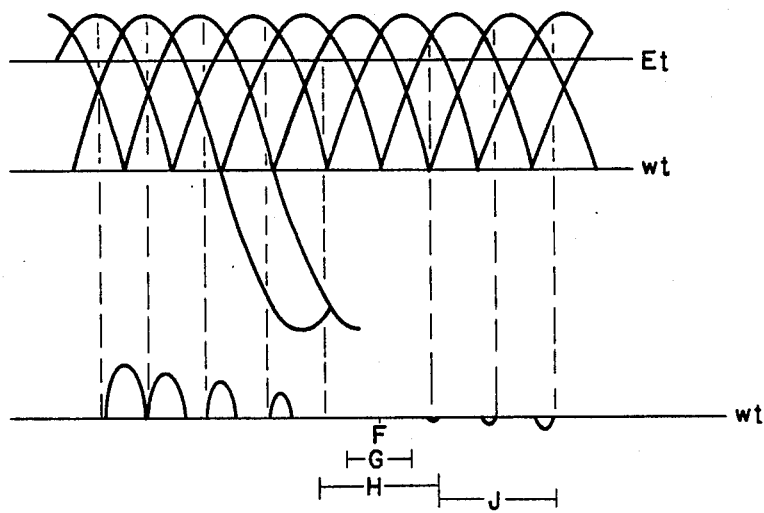

Referring to FIGS. 2A–C, there are shown the available line voltage waveforms from the AC power supply and the output voltage to the motor due to the firing of the forward or reverse bridges. The bottom axis shows the DC current (i) generated through the DC electric motor 40. $E_C$ represents the back EMF level. The firings of the SCRs are impressed upon the motor back EMF. FIG. 2A represents the waveform for a continuous conduction state of the motor current. FIG. 2B represents the waveform for a discontinuous conduction state of motor current. FIG. 2C shows the waveform of the current in reversing from the forward bridge to the reverse bridge.

Referring to FIG. 2A, point A represents the 0° (full advance) firing angle for a SCR. In, FIG. 2A, an SCR is fired from point B to point C to produce the current (i). A second SCR is fired at point C to produce current on the next phase of the AC voltage waveform. In this manner, continuous current (i) is generated by the SCR for energizing the DC electric motor 40, as illustrated on the lower axis.

Referring to FIG. 2B, under discontinuous current conduction, the SCRs are not continuously conducting. Referring to the lower axis, there is a period, D, in which no SCR is being fired. Thus, the current is discontinuous to the motor. The motor voltage where no SCR is conducting is just the same as the motor back EMF. When an SCR is fired, it follows the AC line if it were total resistive load right to the point where the AC line voltage crosses the motor motor back EMF level $E_c$. Theoretically, the SCR should turn off, but because the SCR has current flowing through it, it continues to follow the AC line waveform until the current decays to zero in the motor inductance. It then switches back to the level of the motor back EMF level $E_c$.

Referring to FIG. 2C, there is shown the waveform of the current when switching from the forward to the reverse bridges. In FIG. 2C, the point F is where the current regulator is gradually integrating down to produce less and less positive current and is coming to a point in which negative current is required to switch to the reverse bridge. The time between the positive current and the generation of the negative current is known as the deadband, region H. In an analog integrator, the deadband is on the order of 100 msec with small errors. In the region marked J, the reverse bridge is firing to cause a reverse direction in the DC electric motor.

3. Current Feedback Circuit 56

The current feedback circuit 56 samples and holds the current provided by the current shunt 54. Preferably, the circuit feedback circuit comprises a microcomputer and associated hardware such as an analog digital convertor to convert the analog signal from the current shunt to a binary bit count in a manner well known in the art. During the time of reversal at suitable times when no rectifier is conducting, no current is flowing in the circuit, region G of FIG. 2C. However, because of inaccuracies in the current feedback circuitry, a current signal may be measured during region G. This offset current is measured and stored by the current feedback circuit 56 for adjusting future current feedback signals.

In addition to measuring an offset current signal in the current feedback circuit, the current feedback circuit measures the current (i) in the motor circuit. The current (i) is sampled four times during each firing of an SCR. A current sample is taken at 10, 21, 30, and 43 degrees (60 Hz) after the last firing of an SCR and stored. The motor control circuit 10 uses these samples (S1, S2, S3, and S4, respectively) for determining the condition of the current in the circuit. For example, if the S4 sample is less than 9% of a predetermined current rating after offset correction, then the current is considered discontinuous. Additionally, if the sum of S2 and S3 after offset current correction is less than 8% of a predetermined current level, the current is considered to be zero. Basically, the current sample used in the motor control circuit is not based upon one current sample but four current samples. The four samples increases the confidence in the current sample value and attenuates any logic errors in the instrumentation.

4. Block Diagram of the Current Regulator

Referring now to FIG. 3, there is illustrated a block diagram of a current regulator of the present invention. The current regulator comprises a digital proportional plus integral controller 80 and a reversing controller 90. The digital proportional plus integral controller 80 and reversing controller 90 preferably are implemented in the logic of a microcomputer and associated hardware in a manner well known to those skilled in the art. The signals used in the functional block diagram are converted and normalized to binary bit counts. For example, a current signal previously converted from an analog signal to a binary bit count may be represented as a bit count of $+127$ for maximum current and a bit count of $-127$ for minimum current. The input to the current regulator 80 is the current loop error signal generated from the difference of the current command signal generated from the speed controller and the current feedback signal. The output of the reverse controller 90 is a current loop output which is applied to the firing control circuit to fire the SCRs.

In block 100, four samples from the current sensor 54 are taken to measure a current sample in the DC electric motor 40 as previously discussed with reference to FIG. 2C. A current offset is measured which corrects any zero offset in the current shunt signal, block 102. The zero offset current is measured when there is no current passing through the current shunt 54. The sample corrected by the zero offset are summed with the current command from the speed regulator to produce a current loop error signal 62, block 101. The current loop error is applied to one input of the current regulator 80. The other input is a feedback signal from the reversing controller 90. The current loop error is fed through a digital clamp 104 to limit the current loop error between plus or minus 127 bit counts. The current loop error signal is then fed to an integral path 92 and a proportional path 94. In the integral path 92 and proportional path 94, logic switches 106 and 108, respectively are used to generate different gains to multiply the current loop error signal. The separate gains are required to first, control the motor when it is in the continuous current mode and second, to control the motor when it is in the discontinuous mode. If the switches 106 and 108 are in a zero position, the current loop error signal 62 is multiplied by gains for continuous current, blocks 110 and 112. If the switches 106 and 108 are in the one position, the current loop error signal 62 is multiplied by an appropriate gain for discontinuous conduction through blocks 114 and 116, respectively. The proportional path 94 includes differentiator 120 which differentiates the current loop error signal 62 before applying the gains of the proportional path 94. The output from the proportional path 94 and output from the integral path 92 are added at junction 122 to form a proportional plus integral signal.

The proportional plus integral signal is applied to one input of switch 124. The switch 124 is an advance rate limit switch which limits the proportional plus integral signal from advancing faster than the system is physically capable of achieving. In other words, the switch 124 holds off the proportional plus integral signal until the firing control circuit 16 has time to apply all the commands from the reverse controller 90.

The output from the advance rate limit switch 124 is summed in summing junction 126 with the integrated output from the reverse controller circuit 90 through integrator 128. The output from the summing junction 126 is applied to the input of the reverse controller 90. The reverse controller 90 contains the necessary hardware and logic to reverse the switching bridges. The output from the integrating junction 126 is input into a forward clamp 132 or a reverse clamp 134 depending upon the position of the forward/reverse switch 131. If the switch 131 is in the "0" position, the forward bridge is conducting. If the switch 131 is in the "1" position, the reverse bridge is conducting. The switch 131 is controlled by the sign of the current loop output. Essentially the sign of the current loop output determines which bridge is firing. The forward clamp 132 limits the firing advance in the forward direction to a fully advance limit of 255 bit counts. The minimum value is the retard limit of 5 bit counts during discontinuous current conduction and 10 in continuous current conduction. Reverse/clamp 134 limits the proportional plus integral signal in the reverse direction. Reverse/clamp 134 limits the firing advanced in the reverse direction to $-256$ bit counts and to the retard limit of minus 5 bit counts in the discontinuous current conduction and minus 10 bit counts in the continuous current conduction. The signal from switch 131 is applied to one input of a current loop reversal switch 136. The current loop reversal switch 136 controls the firing to the opposite bridge during reversal. Four conditions are used for determining the position of the current loop reversal switch 136.

The first condition for reversal is that the sign of the current loop error signal 62 is opposite to that of the current loop output 130. The other conditions for reversal are that the current regulator be in discontinuous current conduction. In addition, the system looks at samples S2 and S3 of the four samples from the current sensor and determines whether the magnitude of these samples is below a predetermined limit. If these samples are below this limit, the current regulator is allowed to reverse. If the current feedback circuitry reads a bad offset reading in the current sensor, the current regulator would never satisfy the two conditions of discontinuous current and zero current as determined by samples $S_2$ and $S_3$ of the four samples of current. To protect against an bad offset reading, the control circuit looks for five continuous firings in a row at the retard limit. If there are five continuous firings at the retard limit, no current will be flowing in the motor. This guarantees that the control circuit can reverse and the current regulator will ignore a bad offset reading.

In addition to the difference of sign in the current loop error and the current loop output, the discontinuous current condition, and low current condition, an additional condition is that the reverse controller must command a retard by a programmable threshold limit (voltage). This last condition prevents unnecessary reversals caused by noise in the system. In other words, until the firing angle command has retarded by a programmable limit, no reversal is allowed by the reverse controller. Thus, the reverse controller can vary this programmable threshold limit before it allows a transition across the deadband region to the reverse bridge. This threshold limit varies to affect a smooth continuous transition from the forward to reverse bridge.

Once the reversing controller 90 determines that it is possible to reverse, the current loop reversal switch is placed in the one position. In this position, the previous firing angle command from the current loop ouput 130 is used as an address in a lookup table 135 to determine the new angle of firing for the reverse bridge. There are actually two conditions to determine the right angle to fire. The first condition is that the new firing angle is equal to 240° minus the old firing angle. The second condition is determined by looking at the magnitude of the motor back EMF to give an estimate of where a safe angle to fire is when firing begins on the reverse switching bridge. This is accomplished by additional lookup tables in the reversing controller 90 that are based on the angle that was firing just before reversal.

Essentially, since the voltage motor is known and what the motor would produce by giving it a firing angle, the firing angle can be predicted by knowing the back EMF of the motor. The lookup tables 135 are used to make the best decision as to where to fire to start producing current in the reverse bridge. It is important to note that this decision to reverse is done in approximately 5 to 10 msec and reversal can be done with no deadband. However, to make sure that a first firing on a reverse bridge will not blow a fuse or damage an SCR, the decision to reverse is delayed by 60° to protect the switching elements.

The output from the current loop reversal switch 136 is fed to a preconditioning switch 138. Normally, the motor is running and the precondition switch 138 allows the output of the reversing switch to pass through. However, the preconditioning switch is set to the one position when the motor is not running or at start-up. This is known as a precondition mode. Basically the precondition switch 138 shuts off the output from the current loop reversal switch 138 and holds the current loop output 130 to a fixed angle near the retard limit as determined by a running switch 140. If the motor is running, the running switch 140 is placed in the one position which is the running mode. This holds the firing angle at the retard limit on the bridge currently firing. The bridge currently firing is determined by the sign of the current loop output. This angle is designed to protect the switching elements from any damage. On startup, the running switch is placed to the zero position to create 120° retard for starting the motor. This provides a safe firing angle for the switching elements at start up.

The output from the preconditioning switch 138 is applied to an input of a trip switch 142. The trip switch detects an error condition in the motor. The condition for the trip switch being tripped (one position), is an overcurrent condition, overspeed condition, or any number of conditions that the motor is operating in an unsafe condition. In this circumstance, the trip switch is placed in the one position to generate a firing angle at full retard on the bridge currently firing which is the safest firing angle to protect the SCRs. Under normal operating conditions the output from the reversing switch 136 is the output from the trip switch 142.

The output from the trip switch is the current loop output 130 which is fed to the firing circuit to create a firing angle to fire the switching elements. The current loop output 130 is also fed through an integrator 128 as a feedback to the integrating junction 126. The current loop output 130 is also applied as an input to the lookup tables to determine a new firing angle for the reverse bridge upon reversal. In this manner, the new firing angle for reversal is based upon the previous firing angles.

Thus there has been shown in the present invention a method to program the deadband in reversing from the forward to the reverse bridge or vice versa. It has also been shown by the use of lookup tables to correctly select the initial firing angle on a reversal so as to minimize the delay in the current. It has been shown that the choice of bridge information exhibits more accurate control over the actual bridge selection process even in the presence of offset error in the current feedback signal itself.

To allow a reversal, the method determines that the sign in the current loop error and the current loop output are different; there is a discontinuous current condition and a zero current condition; and that the firing angle reaches a predetermined threshold limit.

In this manner, the control of the DC electric motor is greatly enhanced during reversal by controlling the deadband thereby causing a smooth continuous transition. While the present invention has been shown and described with reference to an illustrative embodiment thereof, and with reference to the drawings, it should be understood that various changes and modifications may be made to the form in detail thereof, by one skilled in the art, without departing from the scope of the present invention. Therefore, it should be understood by all those whom it may concern that the shown embodiments, and the drawings have been given for the purposes of illustration only, and are not intended to limit the scope of the present invention, or the protection sought to be granted by letters patent, which are solely to be defined by the accompanying claims.

We claim:

1. In a four quadrant motor control system having first and second controllable bridge rectifier power regulators for supplying excitation to a DC electric motor for controlling the direction of motor rotation, the system being capable of operating in a continuous and discontinuous current mode of operation and including a digital electronic control circuit for calculating a firing angle from desired and measured system parameters, a reversing controller for developing a current command for generating firing pulses to fire selected switching elements in the power regulators for controlling the magnitude and polarity of the excitation and a current sensor for sensing motor current, a method for transitioning between the first and second regulators in response to a sensed requirement for reversing excitation to the motor, comprising the steps of:
   (a) sensing an offset correction in the current sensor when no current is flowing through the motor;
   (b) determining when current in the motor is below a predetermined threshold value;
   (c) determining when the firing angle of the first bridge rectifier power regulator reaches a programmable threshold value; and
   (d) transitioning from the first bridge to the second bridge a programmable time interval after the firing angle of the first bridge rectifier power regulator and motor current reach their respective threshold values.

2. The method of claim 1 further comprising the step of sensing a discontinuous current in the motor.

3. The method of claim 2, wherein the step of sensing discontinuous current further comprising the steps of:
   (i) sampling the discontinuous current in the motor a first predetermined number of samples;
   (j) selecting a second predetermined number of samples from the first predetermined number of samples; and
   (k) averaging the second predetermined number of samples to achieve a value of the discontinuous current.

4. The method of claim 3, further comprising the step of adding the current offset correction to the average value of the discontinuous current.

5. The method of claim 4, further comprising the step of transitioning from the first bridge to the second bridge when the compensated value of current is less than a predetermined value.

6. The method of claim 1, further comprising the steps of:
   (l) sampling the current in the motor a first predetermined number of samples;
   (m) selecting a second predetermined number of samples from the first predetermined number of samples; and
   (n) averaging the second predetermined number of samples for determining a value of the current.

7. The method of claim 6, further comprising the step of adding the current offset correction to the average value of the current.

8. The method of claim 7, further comprises the step of transitioning from the first bridge to the second bridge when the average sample of current is less than a predetermined value.

9. The method of claim 1, further comprising the step of storing the firing angle output in a memory of the motor control system.

10. The method of claim 9, further comprising the steps of:
    (o) recalling the previous firing angle output from the memory; and
    (p) calculating a new firing angle based upon the previous firing angle output.

11. The method of claim 10, further comprises the step of calculating a new firing angle using the previous firing angle as an address in a prestored memory of the digitial electronic motor control circuit, the memory representative of new firing angles calculated from system parameters.

12. The method of claim 9, further comprising the steps of:
    (q) comparing the firing angle output to the reversing condition input; and
    (r) transitioning from the first bridge to the second bridge when the firing angle output is of opposite sign to the reversing condition input.

13. In a motor control system for controlling a continuous and discontinuous current in a DC electric motor, the system having a control regulator for providing a control signal representative of desired motor conditions, a current regulator for controlling a forward and a reverse bridge of solid state switches connected to an AC power source for regulating the current to the DC electric motor, a current sensor for providing a signal representative of actual motor current to the current regulator, a method for transitioning from a forward to a reverse excitation of the motor, said method comprising the steps of:
    (a) sensing in the current sensor a current in the motor;
    (b) sensing a condition in the control regulator representative of a desired motor excitation change;
    (c) generating a current command with the control regulator representative of the reverse excitation;
    (d) producing an error signal for the current regulator representative of the difference between the current command and the sensed current;
    (e) generating in the current regulator from the error signal firing angles for the solid state switches;
    (f) determining when the firing angle of the forward bridge reaches a programmable threshold limit;
    (g) determining when the current becomes discontinuous;
    (h) transitioning from the forward bridge to the reverse bridge after the firing angle of the forward bridge reaches the programmable threshold limit, the current becomes discontinuous and reaches a predetermined value.

14. The method of claim 13, wherein the control system further comprises a firing circuit responsive to the current regulator and connected solid state switches, wherein step (e) further comprises the steps of:
    (i) producing a current regulator output representative of the error signal;
    (j) transmitting the output to the firing circuit; and
    (k) generating firing pulses to the solid state switches.

15. The method of claim 14 wherein step (i) of producing further comprises the steps of:
    (l) determining a start-up condition for the motor; and (m) generating a firing angle for the forward bridge upon start-up by setting the firing angle to a predetermined value.

16. The method of claim 14, wherein step (i) of producing further comprises the steps of:
    (n) sensing a tripped condition for the motor; and
    (o) generating a firing angle for a conducting bridge when a tripped condition is determined by setting the firing angle at a predetermined value.

17. The method of claim 13, wherein step (i) of producing further comprising the steps of:
    (p) storing the output of the current regulator in a memory;
    (q) recalling the previous output of the current regulator from the memory; and
    (r) calculating a current regulator output representative of the error signal and the previous output of the current regulator.

* * * * *